J. A. RANDALL.
POTATO PLANTER.
APPLICATION FILED NOV. 21, 1916.

1,283,892.

Patented Nov. 5, 1918.
3 SHEETS—SHEET 1.

Inventor
John A. Randall
by Herbert W. T. Jenner
Attorney

J. A. RANDALL.
POTATO PLANTER.
APPLICATION FILED NOV. 21, 1916.
1,283,892.
Patented Nov. 5, 1918.
3 SHEETS—SHEET 2.
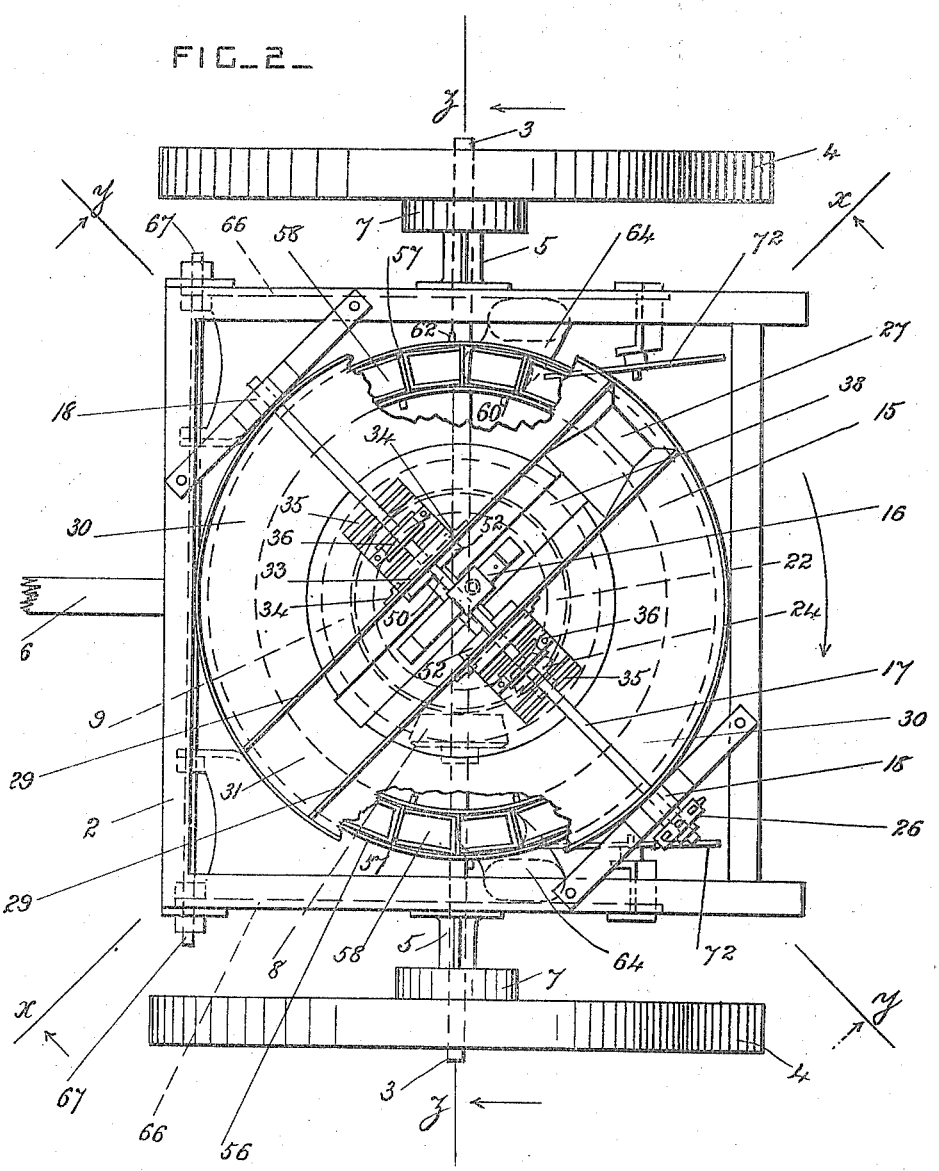
FIG_2_
Inventor.
John A. Randall
by Herbert W. Jenner
Attorney.

J. A. RANDALL.
POTATO PLANTER.
APPLICATION FILED NOV. 21, 1916.
1,283,892.
Patented Nov. 5, 1918.
3 SHEETS—SHEET 3.
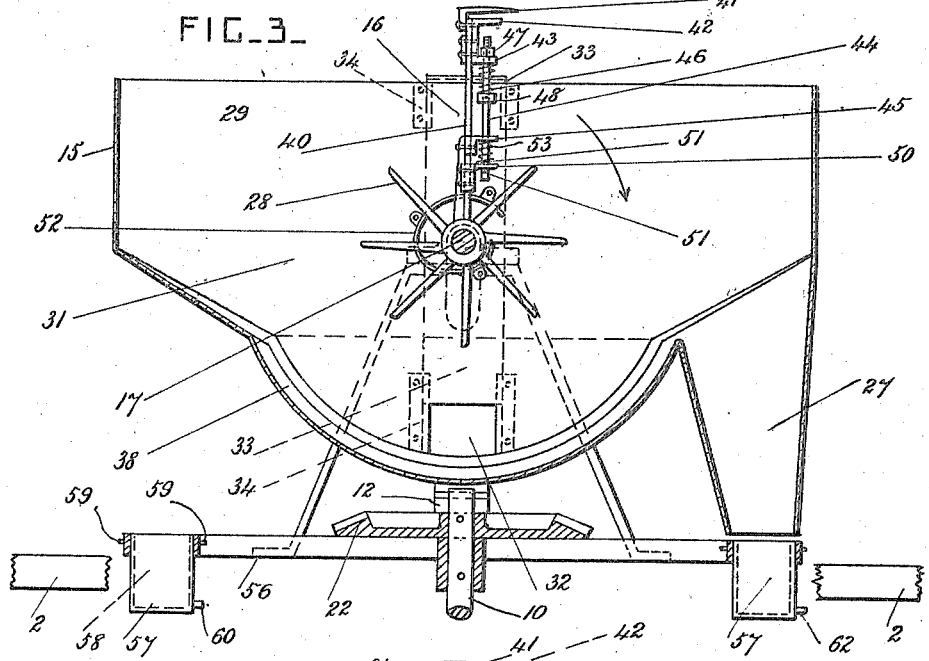
Inventor
John A. Randall
by Herbert W. T. Jenner
Attorney.

UNITED STATES PATENT OFFICE.

JOHN A. RANDALL, OF MINNEAPOLIS, MINNESOTA.

POTATO-PLANTER.

1,283,892. Specification of Letters Patent. Patented Nov. 5, 1918.

Application filed November 21, 1916. Serial No. 132,547.

*To all whom it may concern:*

Be it known that I, JOHN A. RANDALL, a citizen of the United States, residing at Minneapolis, in the county of Hennepin and State of Minnesota, have invented certain new and useful Improvements in Potato-Planters; and I do hereby declare the following to be a full, clear, and exact description of the invention, such as will enable others skilled in the art to which it appertains to make and use the same.

This invention relates to planters for potatoes and other similar food crops; and it consists in the novel construction and combination of the parts hereinafter fully described and claimed whereby the seeds are transferred from the hopper to the dropper wheel and are distributed by the latter to the plows.

Figure 1:
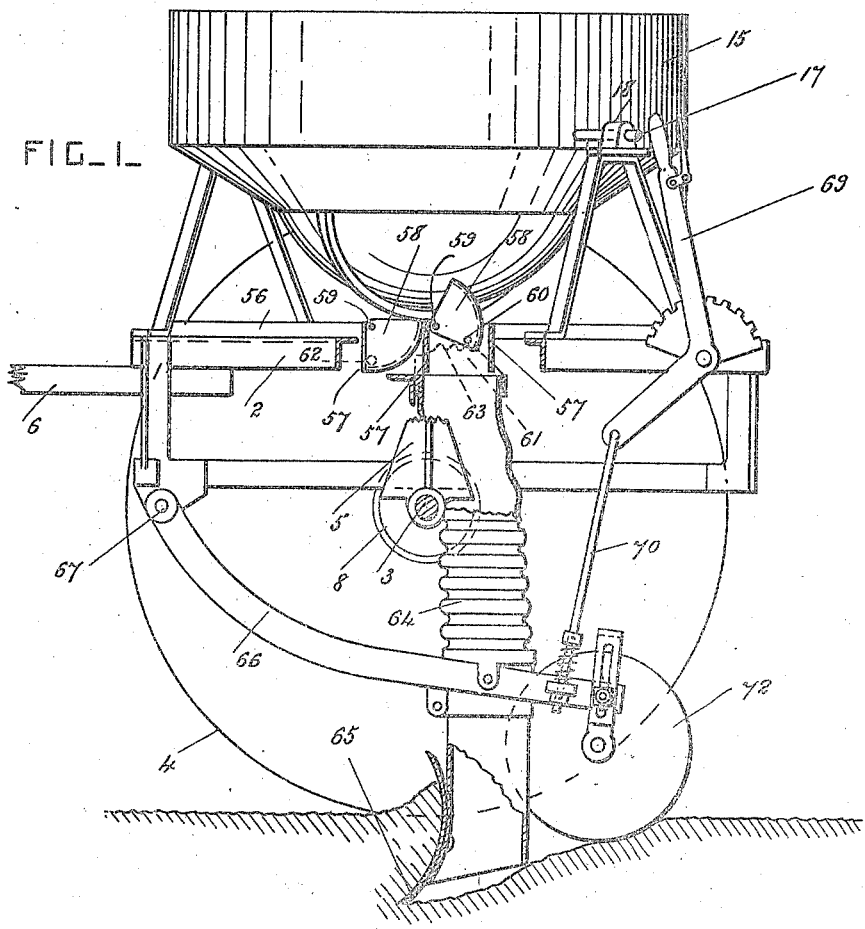
Figure 5:
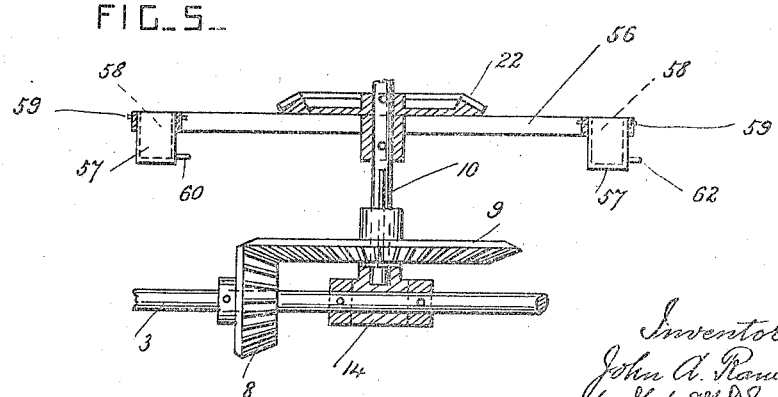

In the drawings, Figure 1 is a side view of portions of a planter constructed according to this invention, certain parts being shown in section and others being omitted, for clearness. Fig. 2 is a plan view of portions of the planter. Figs. 3, 4 and 5 are vertical sections taken on the lines $x$—$x$, $y$—$y$, and $z$—$z$, respectively, in Fig. 2. Fig. 6 is a detail side view of one of the inclined plates 61.

The planter has a main frame 2 which is supported by means of brackets 5 on an axle 3 having ground wheels 4 on its end portions. A draft tongue 6 is provided at the front of the machine, and the ground wheels are connected with the axle by ratchet mechanisms of any approved construction, which are inclosed in suitable housings 7, and which are not illustrated as they are not a part of the present invention.

A toothed wheel 8 is secured to the axle, and is revolved by it when the machine is drawn along in a forward direction, and this wheel 8 gears into a toothed wheel 9 secured on a vertical shaft 10, which is journaled in a bearing 12 secured to the frame 2, and in a footstep 14 supported by the axle. Any other approved mechanism may be used for driving the vertical shaft, and it may be thrown in and out of action in any approved way.

The potato seed sections are placed in a hopper 15 which is secured to the main frame 2 in any convenient way. A feeder 16 is journaled in the hopper 2, and is secured on a feeder shaft 17 which passes through the hopper and is journaled in bearings 18 on brackets which project upwardly from the frame 2. The feeder shaft 17 is driven from a countershaft 19 which is journaled in bearings 20 and 21 which are secured to the main frame 2. The countershaft 19 is driven from the vertical shaft 10 by beveled toothed wheels 22 and 24; and the feeder shaft 17 is driven from the countershaft by a drive chain 25 and sprocket wheels 26. Any other approved driving mechanism may however be used for driving the feeder as the machine is drawn along.

The hopper has a discharge spout 27 at one end of the feeder chamber of the hopper and in the plane of the revolution of the feeder. The feeder is provided with radial arms 28, any convenient number being furnished. Each feeder arm 28 is provided with selector mechanism, and as these mechanisms are all alike, they are not all fully illustrated.

The hopper is provided with two partitions 29 which divide it into three chambers. The potato seed sections are placed in the two outer chambers 30, and the feeder works in the middle or feeder chamber 31. The lower parts of the partitions 29 have discharge openings 32, and 33 are slidable doors which work in guides 34 on the partitions, and which regulate the passage of the seeds to the feeder chamber. The lower parts of the outer chambers are suitably curved or inclined, and 35 are toothed shoes or agitators which slide in the bottoms of these outer chambers and prevent the seeds from sticking or bridging in them. These shoes are reciprocated by means of eccentrics 36 secured on the feeder shaft; and eccentric-rods 37 pivoted to the said shoes and to the eccentric-straps. The middle portion of the feeder chamber is provided with a shallow trough 38 the bottom of which is arranged concentric with the feeder shaft, and the seeds slide laterally into this trough after passing through the openings in the partitions.

Each feeder arm has two parallel and radial guide bars 40 secured to it, and a non-slidable jaw 41 is secured to the end portions of these guide bars, so that it projects forwardly of them in the direction of the motion of the feeder, as indicated by the curved arrow in Fig. 3 and works like a scoop in the bottom of the trough 38. A slidable jaw 42 is arranged opposite the jaw 41, and is secured to a crosshead 43 which slides on the guide bars 40. A push-rod 44 is provided, and is arranged to slide radially in a carrier plate 45 secured to the feeder arm. The outer end portion of this push-rod is operatively connected with the crosshead 43 by a spring 46. The push-rod is preferably slidable in a hole in the crosshead, and has a nut 47 screwed on it inside the crosshead. The spring 46 is preferably arranged around the rod between a collar 48 and the crosshead, and when the push-rod is pushed outwardly the spring 46 presses the slidable jaw 42 toward the jaw 41 so that the potato seed section may be gripped between the two jaws without being crushed.

The inner end portion of the push-rod 44 is connected to a cam plate 50 by two cotter pins 51, or in any other convenient way, and the cam plate 50 is slidable radially on the guide bars 40 to which it is slidably connected. A helical spring 53 is arranged between the cam plate 50 and the carrier plate 45, and operates to slide the push-rod inwardly and restore the jaws to their open position.

Eccentric tracks or cams 52 are secured to the partitions of the hopper, and the end portions of the cam plate 50 bear on these tracks so that the jaws are partially closed as the feeder is revolved. The jaws are open as they descend in the trough 38, and they straddle and scoop up one of the potato seed sections in the bottom of it. The jaws are closed upon the seed by the action of the tracks 52 as the feeder is revolved, and the seed is carried around by them until the jaws come vertically over the top of the discharge spout 27, and the feeder arm is substantially horizontal. At this point the cam plate slides over the outer end of the tracks 52, and the spring 53 then opens the jaws so that the seed falls down the discharge spout into the dropper wheel.

The dropper wheel 56 is arranged to revolve in a horizontal plane, and it is secured on the upper end portion of the vertical shaft 10, hereinbefore described. The dropper wheel is arranged to plant two rows simultaneously, and it carries a series of vertical plates 57 arranged radially at its periphery. The dropper wheel is provided with a series of buckets 58 which are pivoted to it by pins 59, and which are open at the top and at one end. These buckets are arranged so that they assume their closed positions by gravity, each pressing its open end against one of the vertical plates 57. The buckets are arcuate in shape, and their pivots are arranged adjacent to the tops of the vertical plates 57, which normally close the open sides of the buckets, and the buckets are tilted to discharge the seeds by moving them pivotally upward.

The bucket is tilted by suitable mechanism, and as shown in Fig. 1, so that the seed may drop from its open end when same is removed from the plate 57. These buckets are revolved under the discharge spout 27.

The buckets 58 are provided with tripping pins 60 and 62, arranged upon opposite sides of the alternate buckets. The pins 60 are on the inner sides, and the pins 62 are on the outer sides of the buckets. Inclined plates 61 are provided and have serrations or corrugations 63 at their upper parts and are supported by the frame 2 and arranged on the opposite sides of the machine, so that when one pin 60 runs up one plate 61, the pin 62 on the opposite side of the dropper wheel runs up the other inclined plate 61.

Flexible discharge chutes or tubes 64 are provided, and are supported in the frame so that they receive the seeds which fall from the buckets when the latter are tilted. These flexible discharge tubes 64 have furrow openers or plows 65 of any approved construction connected to their lower ends. These plows 65 are shown pivotally connected to the frame 2 by arms 66 and pins 67, and they may be adjusted vertically and laterally by mechanism of any approved construction, the flexible tubes being adapted to permit such movements. A lever 69 and a rod 70 are shown for supporting the plow 65 and adjusting its engagement with the ground. The arms 66 also carry disks 72 arranged in suitable positions to the rear of the plows, so that they will close the furrows and cover the seeds which have been dropped down the flexible chutes or tubes into the furrows.

The seeds or seed sections are scooped up one by one by the selector devices attached to each arm of the feeder, and are discharged one by one down the discharge spout into the buckets of the dropper wheel which are timed to receive them as they drop from the spout. The dropper wheel drops a seed at each side of the machine simultaneously when its buckets are tilted by the inclined plates 61, and the horizontal serrations 63 on the said plates are arranged to jar or agitate the buckets as they pass over them in order to assure the dropping of the seeds after the buckets have been tilted.

I do not hereinafter claim the dropper wheel shown and described in this application, as the same is claimed in a divisional application filed on September 3, 1918, Serial Number 252,369.

What I claim is:

1. In a planter, a hopper having a spherical bottom portion, parallel partitions dividing the hopper into three chambers and having feed openings at their lowest parts, a driving shaft journaled crosswise of the said partitions, and feeder mechanism arranged in the middle chamber of the hopper and secured on the said shaft and operating to pick up the seeds which slide down the spherical bottom portion from the side chambers.

2. In a planter, a hopper having a spherical bottom portion provided with a trough at its middle part, partitions arranged parallel to the said trough and dividing the hopper into three chambers and having feed openings at their lowest parts, a driving shaft journaled crosswise of the said partitions and trough, and feeder mechanism arranged in the middle chamber of the hopper and secured on the said shaft and operating to pick up from the said trough the seeds which slide down the spherical bottom portion from the side chambers.

3. In a planter, a hopper having a spherical bottom portion, parallel partitions dividing the hopper into three chambers and having feed openings at their lowest parts, a driving shaft journaled crosswise of the said partitions, means for agitating the seeds arranged in the two side chambers and secured on the said shaft, and feeder mechanism arranged in the middle chamber of the hopper and secured on the said shaft and operating to pick up the seeds which slide down the spherical bottom portion from the side chambers.

4. In a planter, a feeder chamber, a feeder journaled in the feeder chamber and provided with radial guides having non-slidable jaws at their free ends, slidable jaws carried by the said guides, slidable push-rods also carried by the said guides, springs arranged between the said push-rods and slidable jaws, and means for sliding the push-rods outwardly at intervals as the feeder is revolved so as to compress the said springs and thereby cause the jaws to grip the seeds.

5. In a planter, a feeder chamber, a feeder journaled in the feeder chamber and provided with radial guides having non-slidable jaws at their free ends, slidable jaws provided with crossheads and carried by the said guides, carrier plates secured to the feeder, push-rods slidable in holes in the said carrier plates and crossheads and having projections on their middle parts, springs arranged on the push rods between their said projections and the crossheads, nuts screwed on the end portions of the push-rods which project through the crossheads, and means for sliding the push-rods outwardly at intervals as the feeder is revolved.

6. In a planter, a feeder chamber provided with a delivery spout, a feeder journaled in the said chamber and provided with radial guides having non-slidable jaws at their extremities, slidable jaws carried by the said guides, slidable push-rods also carried by the said guides and operating the slidable jaws, springs interposed between the push-rods and the slidable jaws, cam-plates connected to the push-rods and extending crosswise of the feeder chamber, eccentric tracks secured to the sides of the feeder chamber and operating to slide the cam-plates outwardly to compress the said springs and close the jaws during a portion of the revolution of the feeder, and springs which retract the slidable jaws automatically when the cam-plates are free of the eccentric tracks.

In testimony whereof I have affixed my signature.

JOHN A. RANDALL.

Copies of this patent may be obtained for five cents each, by addressing the "Commissioner of Patents, Washington, D. C."